United States Patent
Wagner et al.

(10) Patent No.: US 10,524,330 B1
(45) Date of Patent: Dec. 31, 2019

(54) REDUCING FALSE TRIGGERS FROM A PASSIVE INFRARED SENSOR

(71) Applicant: ABL IP Holding LLC, Atlanta, GA (US)

(72) Inventors: Phillip Ryan Wagner, Baltimore, OH (US); Bruce A. Bharat, Alpharetta, GA (US); Shawn L. Pleasants, Granville, OH (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 16/211,410

(22) Filed: Dec. 6, 2018

(51) Int. Cl.
| | |
|---|---|
| *H05B 33/00* | (2006.01) |
| *H05B 37/02* | (2006.01) |
| *G05B 19/4155* | (2006.01) |
| *G05B 19/406* | (2006.01) |

(52) U.S. Cl.
CPC ....... *H05B 37/0227* (2013.01); *G05B 19/406* (2013.01); *G05B 19/4155* (2013.01); *H05B 37/0218* (2013.01); *G05B 2219/35585* (2013.01); *G05B 2219/37211* (2013.01); *G05B 2219/37426* (2013.01)

(58) Field of Classification Search
CPC ............ H05B 37/0272; H05B 33/0845; H05B 37/0227; H05B 33/0872; H05B 37/0254; H05B 33/0815; H05B 33/0842; H05B 33/0851; H05B 33/0866; H05B 33/0893; H05B 37/0245; H05B 33/08; H05B 33/0803; H05B 33/0854; H05B 33/0857; H05B 33/0863; H05B 33/0869; H05B 33/089; H05B 33/0896; H05B 37/0209; H05B 37/0218; H05B 37/0236; H05B 37/0281
See application file for complete search history.

(56) References Cited

U.S. PATENT DOCUMENTS

| | | |
|---|---|---|
| 8,729,446 B2 | 5/2014 | Verfuerth |
| 9,210,759 B2 | 12/2015 | Reed |
| 9,405,000 B2 | 8/2016 | Yeh et al. |
| 9,433,062 B2 | 8/2016 | Reed |
| 9,642,217 B2 | 5/2017 | Kim et al. |
| 2010/0265100 A1 | 10/2010 | Jalbout et al. |
| 2014/0103815 A1 | 4/2014 | Chai |
| 2016/0081162 A1 | 3/2016 | Reed |

(Continued)

FOREIGN PATENT DOCUMENTS

| | | |
|---|---|---|
| CN | 102123550 A | 7/2011 |
| CN | 203136283 A | 8/2013 |

(Continued)

*Primary Examiner* — Monica C King
(74) *Attorney, Agent, or Firm* — Kilpatrick Townsend & Stockton LLP

(57) ABSTRACT

A system adjusts detection parameters used to process a signal from a PIR sensor to reduce false triggers. A detection module receives a sensor output signal from a PIR sensor and inputs from environmental sensors, including a temperature sensor. The detection module adjusts detection parameters of a bandpass filter and/or a threshold comparison module based on the inputs from the environmental sensors. The detection module generates a motion presence signal that indicates whether motion has been detected and that compensates for external environmental factors.

18 Claims, 5 Drawing Sheets

(56) References Cited

U.S. PATENT DOCUMENTS

2016/0150622 A1    5/2016   Flinsenberg et al.
2016/0286627 A1    9/2016   Chen et al.
2018/0220506 A1*   8/2018   Sadwick ............ H05B 37/0254

FOREIGN PATENT DOCUMENTS

| CN | 203301823 U   | 11/2013 |
| CN | 104713016 A   | 6/2015  |
| CN | 106793275 A   | 5/2017  |
| KR | 101204374 B1  | 11/2012 |
| KR | 20130023991 A | 3/2013  |
| KR | 101266279 B1  | 5/2013  |
| KR | 20140136200 A | 11/2014 |

* cited by examiner

REDUCING FALSE TRIGGERS FROM A PASSIVE INFRARED SENSOR

TECHNICAL FIELD

This disclosure relates generally to lighting system controls and more specifically to reducing false triggers from Passive Infrared (PIR) sensors used to detect occupancy.

BACKGROUND

Passive infrared (PIR) sensors may be used for occupancy sensing. For example, a lighting fixture may use a PIR sensor to detect occupancy and then control a lighting fixture based on the detected occupancy. Environmental conditions can increase the likelihood that the PIR sensor will experience a false trigger, or an activation of the system by something other than a valid target. False triggers cause energy to be wasted and provide inconsistent lighting behavior. One approach to reduce the likelihood of a false trigger adjusts the sensitivity of the PIR sensor. One of the problems with conventional solutions which adjust the sensitivity of the PIR sensor is that the detection range of the sensor may be overly limited. Limiting the range of the sensor may prevent the system from being effectively used in certain locations or for certain applications. The present invention provides a solution to the challenges posed by false triggers of a PIR sensor.

SUMMARY

The present invention is directed to systems and methods for reducing false triggers by a PIR sensor. A false trigger may be avoided by adjusting the parameters of a lighting system that receives a signal from the sensor to reduce the effects of environmental factors, which may increase the likelihood of a false trigger. The parameters of the lighting system may be adjusted differently for different operating environments.

In one aspect of the invention, false triggers are reduced by adjusting a threshold or filter to reduce adverse impacts of environmental conditions. Various environmental sensors, including temperature, airflow, and an accelerometer provide inputs to the system that adjust detection parameters to reduce the impacts of the environmental conditions, thus reducing the likelihood of a false triggering of the sensor. In one example, a threshold of detection can be adjusted to a higher or lower value depending on a condition which makes the signal more or less noisy, such as temperature. The detection parameters may be updated in response to a particular change in environmental factors or at predetermined time intervals.

These and other aspects of the invention will be described in more detail and in the accompanying figures. The reduction in false triggers reduces wasted energy, and provides a more consistent lighting behavior.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Briefly described, the present disclosure generally relates to reducing false triggers in a lighting fixture. Various aspects involve using one or more environmental sensors to detect environmental conditions that can produce or contribute to false triggering of the lighting fixture. A lighting fixture may include a PIR sensor and multiple environmental sensors including a temperature sensor. The environmental sensors may adjust parameters used to detect motion. For example, the temperature sensor detects an ambient temperature and outputs a temperature adjusted output signal to a detection module. The detection module processes the output from the PIR sensor using an adaptive bandpass filter and a variable threshold comparison module. The detection module can adjust the passband of the bandpass filter and/or adjust the threshold value of the threshold comparison module based on the temperature adjusted output signal. The adjustments reduce the number of false triggers. The detection module outputs a motion presence signal that indicates whether motion has been detected. A controller controls a light source based on the motion presence signal. The controller may also consider other inputs when controlling the light source, including inputs providing environmental information. The controller may communicate with other controllers associated with other light fixtures and provide them with information about the detected environmental conditions, adjustments to the bandpass filter, and/or adjustments to the threshold value.

Figure 1:
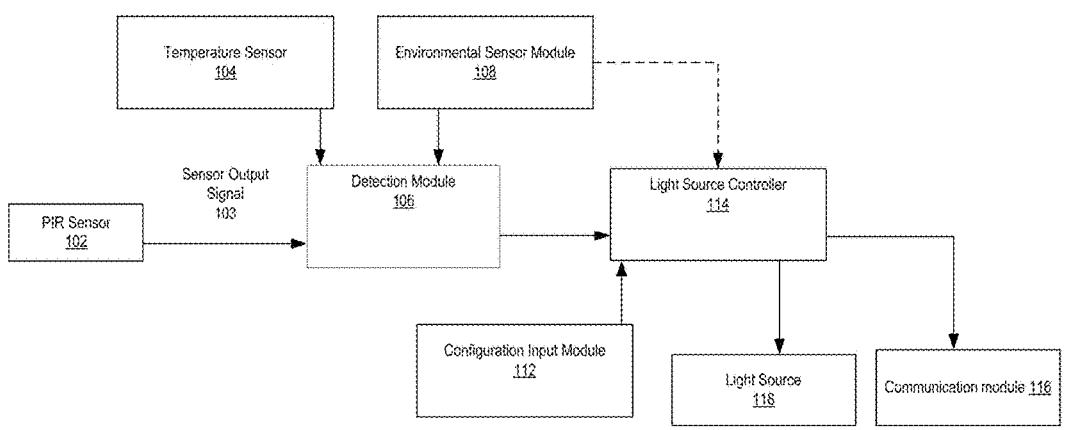
FIG. 1 depicts an example of a lighting fixture that includes a detection module and environmental sensors.

Referring now to the figures, FIG. 1 depicts an example of a lighting fixture including a detection module, a temperature sensor, and an environmental sensor module. A passive infrared (PIR) sensor 102 may detect motion and generate a sensor output signal 103. For example, the PIR sensor 102 may detect a change in an amount of infrared radiation impinging on the sensor. In response to the sensor detecting a change in infrared radiation impingement, the PIR sensor 102 may generate a sensor output signal 103. The sensor output signal 103 may be a positive or negative voltage signal corresponding to the movement detected and the direction of movement. For instance, the movement detected may be indicated by a magnitude of the positive or negative voltage based on the quantity of infrared radiation (e.g., a vehicle engine has a higher magnitude voltage, a human body has a lower magnitude voltage). The direction of the detected movement may determine the positive or negative value of the sensor output signal 103. Various types of motion may result in different sensor output signals 103. The frequency components of the signal may be based on the speed of the detected object. For example, an object moving at a low speed may have a different sensor output signal 103 than an object moving at a high speed or an object moving at low speed may have a different sensor output signal 103 than another object moving at the same speed, but in a different direction (e.g., lateral motion relative to the sensor, motion towards or away from the sensor). In another example, different types of objects may result in different sensor output signals 103 determined by the magnitude of the infrared radiation impinged on the PIR sensor 102 (e.g. a single human, or a group of humans, a small vehicle, or a larger vehicle).

The PIR sensor 102 may provide the sensor output signal 103 to a detection module 106. The detection module also receives inputs from one or more sensors, such as a temperature sensor 104 and an environmental sensor 108. In some embodiments, the sensor output signal may be characterized by a quantity of noise based at least in part on the ambient environment where the system is deployed. For example, in an environment with a high ambient temperature, the sensor output signal 103 may be characterized by a high amount of noise. In an environment with a low ambient temperature, the sensor output signal 103 may be characterized by a low amount of noise.

In some cases, the detection module 106 may adjust parameters used to determine object detection based on the inputs from the temperature sensor and the environmental sensor module. The detection module may use multiple components to determine whether motion has been detected, such as a bandpass filter or sampling module, a threshold comparison module, and possibly other modules. The detection module may adjust one or more of the parameters used by the bandpass filter (or sampling module) or the threshold comparison module based on the received inputs. Additional details about the detection module are provided in connection with FIG. 2. The detection module 106 outputs a motion presence signal that indicates whether the detection module detected motion to a light source controller 114.

The environmental sensor module may be able to detect multiple environmental conditions including ambient light, airflow, acceleration, etc. It may provide information about the detected environmental conditions to the detection module 106 and/or the light source controller. In some cases different information is provided to the detection module 106 and the light source controller 114. In other cases the same information may be provided to the detection module and the light source controller.

In FIG. 1, the light source controller 114 controls light source 118 based on the output received from the detection module. The controller may also consider other inputs or information when controlling the light source.

The light source controller 114 may support multiple modes of operation based on configuration inputs 112. A mode of operation may specify various light attributes, such as intensity, color temperature (CT), color, a duration of illumination, or a direction of illumination. In some cases, modes of operations may change based on factors such as the time of day, ambient light, and other factors.

The light source controller 114 may be a single component having a processing device, a memory, input/output ports, and other elements or it may include multiple components, each component providing one or more functions. The light source controller 114 may be configured using firmware, which may be updated as needed. In some cases, the firmware may be updated by wired or wireless devices communicatively coupled to the light source controller 114.

The light source controller may include a communication module 116 or it may communicate with a communication module that is separate from the controller. The communication module may include an RF transceiver capable of communicating with other communication modules for other lighting fixtures or with a remote device. The protocols supported by the RF transceivers may include WiFi®, ZigBee®, ZWave®, Bluetooth®, Insteon®, other protocols from the IEEE 802.11 or 802.15 family of standards, cellular communication, and/or other possible communications protocols as can be appreciated The communication module 116 may enable the controller to communicate motion detection information (e.g., detected motion, detected type(s) of motion, direction of motion, etc.) with another fixture, to receive detected motion information from another fixture, and to receive configuration information from another device.

An example of an input to the light source controller 114 is provided by configuration input module 112. In some cases, a configuration input module 112 may be an application on a mobile device that configures the controller with multiple configuration input settings. In other cases, the configuration input settings may be preset during manufacturing or configured upon installation. The configuration input module 112 may configure the controller to enable one or more modes of detection at certain times of the day. It may also configure the attributes or other aspects of the modes of operation. For example, the configuration input module 112 may configure the light source controller 114 to control the light source to output light at a first intensity during a first time period of a 24-hour period and to output light at a second intensity during a second time period of the 24-hour period. Although FIG. 1 illustrates that configuration input module 112 communicates directly with light source controller 114, it may communicate with the light source controller via communication module 116.

In some examples, the light source controller 114 may be configured to consider additional inputs or information when controlling light source 118. One type of input is an input from the environmental sensor module 108. The light source controller may be configured to control light source 118 differently based on different environmental conditions. For example, the light source controller 114 may determine that the environmental sensor module 108 input indicates adequate ambient light within the environment, and therefore may not cause light source 118 to illuminate in response to detected motion. Input from the environmental sensor module 108 may cause the light source controller to determine that an intensity of the light output by the light source for a covered parking lot, interior pathway, or a road passing through a tunnel is different than an intensity for an uncovered parking lot, uncovered footpath, or open roadway based on the detected ambient light.

Some non-limiting examples of light source 118 include, but are not limited to a light-emitting diode (LED), organic light-emitting diode (OLED), a fluorescent lamp, an incandescent lamp, and/or other possible light emitting device(s).

The description of communication between modules in FIG. 1 is illustrative and is not limiting. In some embodiments, modules may communicate using wired or wireless communication methods.

A false trigger may result when the detection module interprets the sensor output signal as indicating motion but object motion is not actually present. This may occur when one or more environmental conditions erroneously trigger the sensor or make it more likely that the sensor is erroneously triggered. False triggers can be caused by temperature variation, wind, fixture movement, or other environmental factors. In one example, an environment with a high temperature creates a noisy infrared detection environment that can cause a false activation of the lighting fixture. In another example, motion of the fixture itself may cause a false activation.

To avoid false triggers that may be caused by environmental conditions, the detection module receives inputs from one or more sensors. The sensors may detect environmental conditions, such as temperature, wind speed, fixture movement or other environmental factors that may result in a false trigger. In addition, the detection module may receive a sensor input or other input that relates to a location of the PIR sensor, such as a vertical location or height of the PIR sensor. The detection module may use the received inputs to adjust a passband of a bandpass filter (or sampling rate of a sampling module) or a threshold of a threshold comparison module so that the motion presence signal more accurately indicates detected motion.

Figure 2:
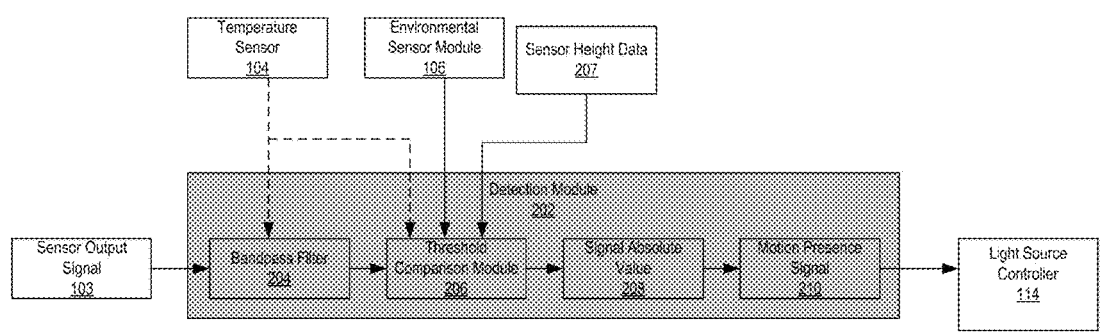
FIG. 2 depicts an example of a detection module using an adaptive bandpass filter configuration and a variable threshold comparison module.

FIG. 2 depicts an exemplary detection module that includes a bandpass filter 204 and a threshold detection module 206. FIG. 2 illustrates that a sensor may provide an input to one or both of the bandpass filter 204 and the threshold detection module 206. For example, temperature sensor 104 may provide information to a bandpass filter 204 and to threshold comparison module 206, whereas environmental sensor module 106 may provide information to only the threshold comparison module 206. Additional sources or sensors, such as height sensor 207, may provide information to the threshold comparison module 206, as well.

The detection module may adjust the bandpass filter, the threshold, or both based on the inputs. The bandpass filter may be adjusted to modify the upper or lower frequency of the passband. The bandpass filter 204 may be configured with a nominal passband based on the type of motion to be detected. The passband of the bandpass filter 204 may be adjusted by shifting a lower limit and/or an upper limit. The threshold may be adjusted to make it more or less difficult to exceed the threshold, i.e., to make it more or less likely to generate a motion presence signal.

The detection module may prioritize the inputs from the sensors and adjust the threshold or bandpass filter using one environmental input (i.e., the input having the most influence on false triggers or the input that is the most extreme outlier from a predetermined range), or alternatively can apply a weighting factor to each of multiple environmental inputs to determine an adjustment. In an example that applies a weighting factor to one or more of the environmental inputs, the detection module may weight each environmental input based on the relative influence of the environmental conditions. For example, if a high temperature makes it more likely that a false trigger will occur than high wind, then an input from the temperature sensor may be weighted more heavily than an input from the accelerometer. In another example, an input that has a value that is the farthest outside a nominal range or the farthest away from a nominal value may be given more weight than an input with a value that is closer to a nominal range or nominal value. As will be appreciated by one of skill in the art, the environmental inputs may be collected or output with any periodicity up to and including continuous.

The detection module receives a sensor output signal 103. Sensor output signal 103 may be an output signal indicating motion detected by a PIR sensor, such as the PIR sensor 102 illustrated in FIG. 1. The detection module filters the sensor output signal using the bandpass filter 204.

Returning to FIG. 2, the threshold comparison module performs a comparison of the filtered output signal to the threshold value. The threshold value may be based on the type of object that is expected to generate the motion and may differ for different types of objects (person, vehicle, etc.) and/or environments where the sensor is employed (outdoor uncovered, outdoor covered, indoor, etc.) As described above, the threshold value may also be adjusted according to one or more inputs to the threshold comparison module 206. When the filtered output signal exceeds the threshold value, then the threshold comparison module 206 may determine that motion is detected. When the filtered signal does not exceed the threshold value, then the threshold comparison module 206 may determine that the signal may be disregarded as noise.

A signal absolute value 208 may be applied to the output of threshold comparison module 206 as a signal processing operation. For a non-limiting example, the output signal from the threshold comparison module 206 may contain both positive and negative values at varying magnitudes, which may then have signal absolute value 208 applied. In an example where the signal absolute value 208 is applied, the resulting signal magnitudes only have positive values of signal strength. The resulting output of signal absolute value 208 may be a motion presence signal 210. An example of a motion presence signals may be an unsigned voltage signal of a magnitude determined by the speed and intensity of the motion detected. The motion presence signal may be output to a light source controller, such as light source controller 114.

Figure 3:
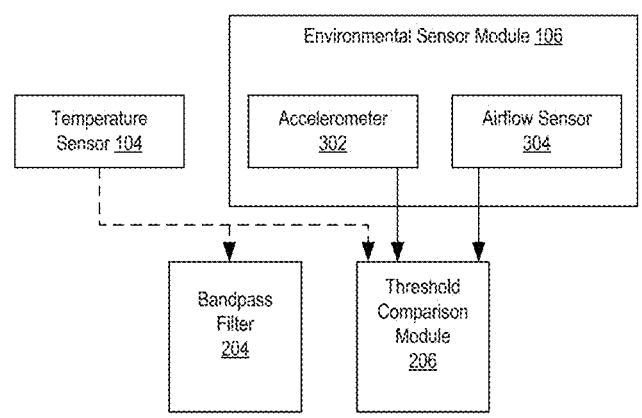
FIG. 3 depicts an example of connections between a detection module and an environmental sensor module and a temperature sensor module.

FIG. 3 depicts an example of connections between components of the detection module and an environmental sensor module and a temperature sensor. Although FIG. 3 illustrates that the temperature sensor is separate from the environmental sensor module, in other systems, the temperature sensor is part of the environmental sensor module. The temperature sensor 104 detects the ambient temperature and provides an input to the bandpass filter 204 and/or the threshold comparison module 206. In some systems, the outputs of the sensors are connected to the bandpass filter and/or the threshold comparison module, whereas in other systems the outputs of the sensors are connected to other components of the detection module, which in turn adjust the passband of the bandpass filter and/or the threshold of the threshold comparison module.

The detection module compares the temperature information received from the temperature sensor to a range of nominal temperatures or to one or more threshold temperatures. The values for the range of nominal temperatures or the threshold temperatures can be predefined during manufacturing, configured by the light source controller based on user-inputs, or defined by the system using measured data to determine statistically relevant values over time (i.e., minimum, maximum, mean, standard deviation, etc.) When the ambient temperature varies outside of the range of nominal temperatures or exceeds a threshold, the detection module 202 may apply an adjustment to the passband of the bandpass filter 204 and/or to the threshold value of threshold comparison module 206. In some cases, the temperature adjustment value is determined as a function of the ambient temperature condition. For example, in an environment with an ambient temperature higher than the nominal range, the passband of the bandpass filter may be narrowed and/or the threshold value may be increased to avoid a false trigger when there is significant ambient noise in the operating environment.

An environmental sensor module 106 may contain multiple sensors that detect environmental conditions. In one example, the environmental sensor module 106 contains an accelerometer 302 and an airflow sensor 304. The accelerometer 302 is used to determine movement of a device, such as movement of a lighting fixture or a pole or other support for a lighting fixture. A lighting fixture can be affected by high wind speeds. The high wind speeds may cause the PIR sensor to detect motion when the motion is due to movement of the fixture or support, instead of movement of an object.

The accelerometer 302 can output a sensed movement signal to the threshold comparison module 206. The sensed movement signal may be a signal that indicates a magnitude of motion associated with the fixture that can adversely influence detection of motion by the PIR sensor. An example of a sensed movement signal is a signed voltage signal with a magnitude representing the intensity of the motion, and a sign representing the direction of the movement. The threshold comparison module 206 can adjust the threshold value according to the magnitude or direction of the sensed movement signal. In some cases, the adjustment can reduce a likelihood that the detection module generates an erroneous motion presence signal.

The threshold comparison module 206 may compare an aspect of the sensed movement signal, such as its magnitude to a predetermined value. If the sensed movement signal exceeds the predetermined value, then the threshold comparison module may adjust the threshold value.

In an exemplary system, the airflow sensor 304 detects a mass flow rate of air through the sensor and determines the ambient airflow. In other systems, other conditions are detected to determine ambient airflow. The airflow sensor 304 may provide an output to the threshold comparison module 206 and the threshold comparison module may adjust the threshold value based on the ambient airflow speed. For example, an ambient airflow, which is higher than a nominal value or range, can indicate that the detection environment may include objects that are moving as a function of the ambient airflow and may cause the threshold comparison module to adjust the threshold value. The adjusted threshold value may compensate for the ambient airflow and thereby reduce the potential for a false trigger because of ambient airflow. When ambient airflow is within a nominal range or below a nominal value, then the threshold comparison module may not adjust the threshold value based on airflow.

Figure 4:
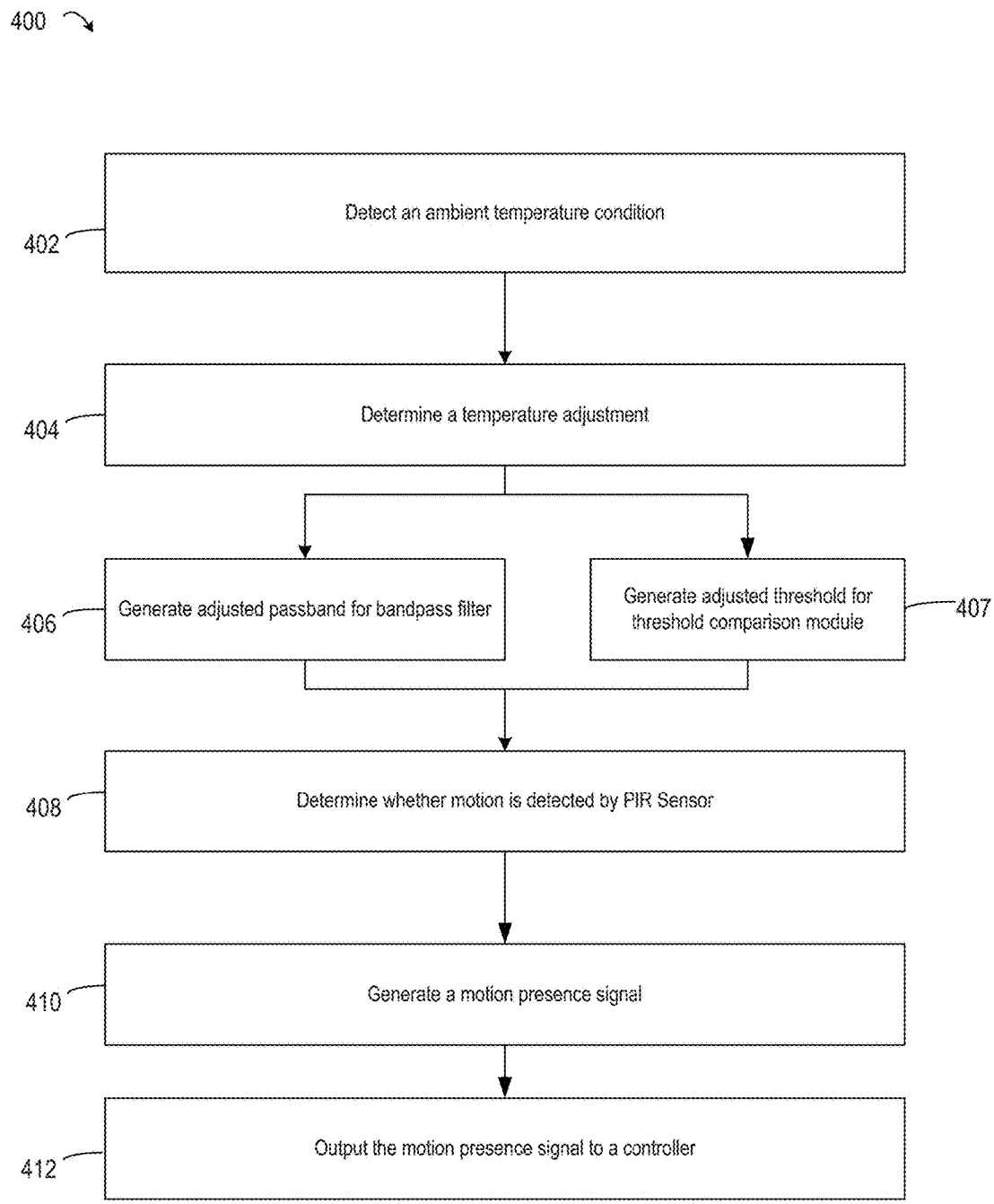
FIG. 4 depicts an example of a process for generating a motion presence signal.

FIG. 4 depicts an example of a process 400 for determining a motion presence signal by compensating for temperature effects on the PIR sensor. The motion presence signal indicates when motion is detected and is provided to the light source controller.

At block 402, the process 400 detects an ambient temperature condition. In some implementations, a temperature sensor is a thermistor that detects ambient temperature of the surrounding environment where the lighting fixture is deployed. In other implementations, the temperature sensor may be a thermocouple, mechanical thermometer, or similar temperature-measuring device. In yet other implementations, temperature information may be communicated to the lighting fixture from another device via the communication module.

At block 404, the process 400 may compare the ambient temperature to a predetermined range of nominal temperatures. If the ambient temperature is within the range, then there may be no adjustment to the bandpass filter and/or to the threshold comparison module and the process ends. If the ambient temperature is outside the range of nominal temperatures, then the detection module 202 may determine that the bandpass filter, the threshold comparison module, or both need to be adjusted based on the ambient temperature. An example of a nominal range of temperatures is 5 degrees above and below a periodically adjusted average, such as a seasonal or annual average temperature. In cases where the ambient temperature exceeds the nominal range, in this case is greater than 5 degrees above or greater than 5 degrees below the periodically adjusted average, the detection module 202 may adjust the bandpass filter, the threshold comparison module, or both.

In another example, for an ambient temperature that is 3 degrees below the periodically adjusted average, the detection module 202 may make no adjustment to the bandpass filter, threshold module, or both.

The process proceeds to block 406 when the bandpass filter is to be adjusted. At block 406, the process 400 involves generating an adjusted passband for the bandpass filter 204. In an environment with an ambient temperature below the nominal range, the passband of the bandpass filter 204 may be increased by adjusting the upper limit higher, the lower limit lower, or both. This configuration is referred to as "high gain." When the temperature is higher than the nominal range, the passband of the bandpass filter 204 may be decreased by adjusting the upper limit lower, the lower limit higher, or both. This configuration is referred to as "low gain." By adjusting the passband of the filter in this manner, more of the noise in the sensor output signal is filtered out, while maintaining sensitivity. In an example, for an ambient temperature that is exceeds the higher limit of the nominal range, the passband of the bandpass filter may be decreased by adjusting the lower limit of the passband up and the upper limit of the pass band down based on the amount that the ambient temperature exceeds the nominal range. In an alternative example, the passband may adjusted in step-wise increments such as adjusting the passband 5% narrower for an ambient temperature that exceeds the upper limit of the nominal range by a small amount, while adjusting the passband 10% narrower for an ambient temperature that exceeds the upper limit of the nominal range by a greater amount.

The process proceeds to block 407 when the threshold comparison module is to be adjusted. At block 407, the process 400 involves generating an adjusted threshold value for the threshold comparison module 206. When the ambient temperature is above the nominal range, the threshold value may be increased or otherwise adjusted. The increase of the threshold value may prevent the erroneous generation of a motion presence signal indicating motion when noise in the operating environment triggers the PIR in the absence of object motion.

When the ambient temperature is below the nominal range, the threshold value may be decreased. The reduction of the threshold value enables a more sensitive detection of signals in a low-noise environment. The reduction of the threshold value increases the likelihood that the detection module will correctly generate a motion presence signal indicating motion.

At block 408, the process 400 involves determining whether motion is detected by the PIR sensor. The process 400 determines if the PIR sensor output signal represents actual "motion" or the result of environmental conditions and is a false detection by the PIR sensor. The process filters the sensor output signal received from the PIR sensor at block 408 using the bandpass filter, including any adjustments made in block 406 to the passband of the bandpass filter. The process also compares the filtered signal from the bandpass filter to a threshold value, including any adjustments made in block 407. When the filtered output signal exceeds the threshold value, the process determines that the motion detected by the PIR sensor is actual motion. In such cases, the process generates a motion presence signal indicating detected motion at block 410. When the filtered output signal does not exceed the threshold value, the process determines the motion detected by the PIR sensor is a false detection caused by environmental conditions. In such cases, the process generates a motion presence signal indicating no detected motion at block 410.

At block 410, the process 400 involves generating a motion presence signal. An example of a motion presence signal is a digital or analog signal that indicates the determination of an actual motion detected. The process determines that actual motion is detected when the filtered output signal exceeds the threshold. The detection module 202 generates the motion presence signal for output to the light source controller 114. In examples when the filtered output signal does not exceed the threshold, the detection module 202 generates a motion presence signal that indicates no motion was detected. Alternatively, the detection module 202 can omit generating a motion presence signal.

At block 412, the process 400 outputs the motion presence signal to the light source controller 114, which uses it to control the lighting fixture. The detection module 202 outputs the motion presence signal to the light source controller 114. The detection module can output the motion presence signal to the light source controller by a wired or wireless connection. An example of a motion presence signal can be an analog or digital signal indicating that a motion was detected.

Although FIG. 4 depicts a process 400 with certain steps in sequence, and other steps in parallel, various alternatives are possible. For example, although blocks 406 and 407 are shown in an alternative configuration, the process 400 can also execute both blocks in parallel or in series. Some blocks, such as blocks 402, 404, 406, or 407 may be performed with a periodicity, up to and including continuously, that may be defined by configuration inputs as described elsewhere herein.

Although FIG. 4 describes a process 400 with a range of temperatures around which adjustments are made, an alternative process may make adjustments based on other criteria including temperature thresholds or discrete temperature adjustments for each unit of measurement or sub-unit of measurement of the temperature sensor. Other methods of determining the adjustment may also be implemented.

Figure 5:
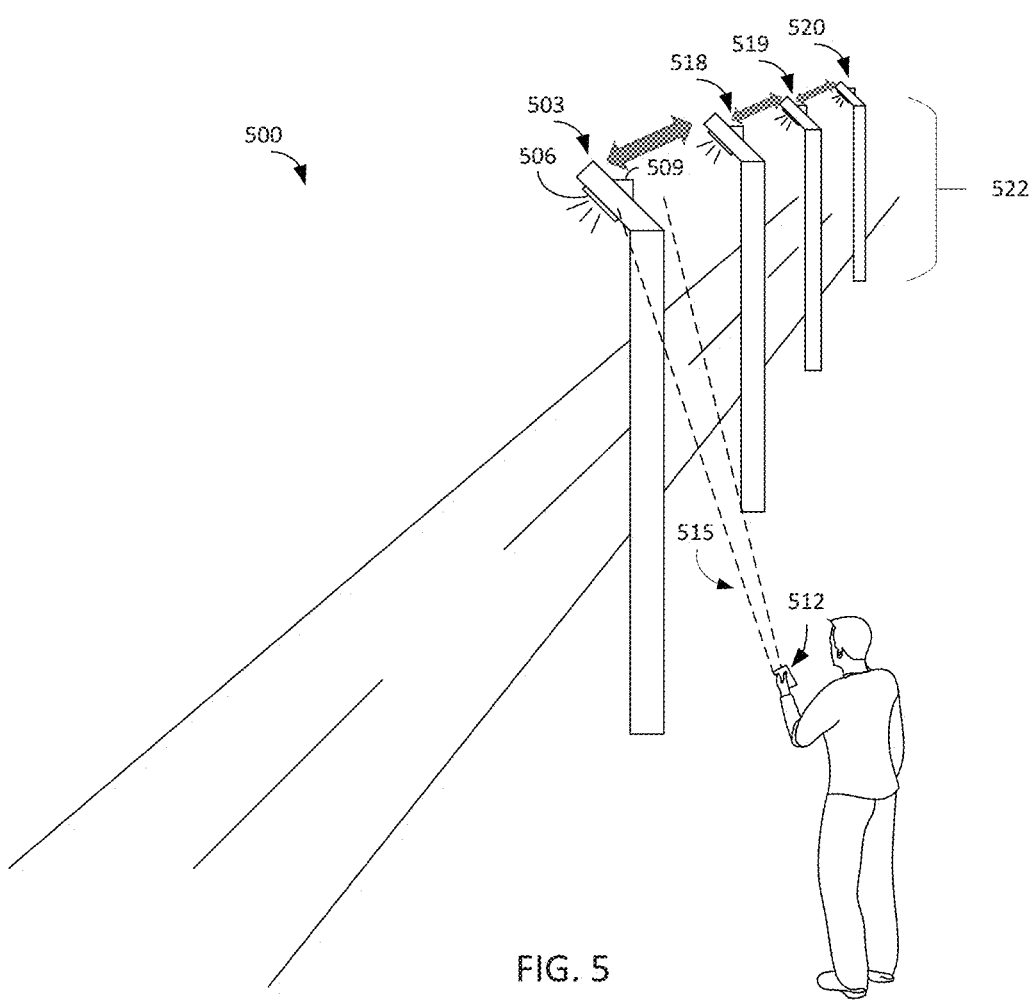
FIG. 5 depicts an exemplary lighting environment that could employ the systems and techniques herein.

With reference to FIG. 5, shown is an exemplary lighting environment 500. The lighting environment 500 includes various lighting fixtures, including the light fixture 503, for illuminating objects in the lighting environment 500, such as a roadway. The light fixture 503 may be affixed to a structure, such as the pole shown with a height 522, and may include a light source 506, a light source controller 509, and other possible components.

The light source controller 509 may include a communication module or one or more RF transceivers, with which the light source controller 509 can discover other light source controllers within range and establish a network among the light source controllers. In some implementations, the light source controller 509 can identify and communicate with light source controllers that are outside the range of its RF transceiver by using other light source controllers that are within range to forward communications between them. The protocols supported by the RF transceivers may include WiFi®, ZigBee®, ZWave®, Bluetooth®, Insteon®, cellular communication or other protocols from the IEEE 802.11 or 802.15 family of standards, and/or other possible communications protocols as can be appreciated.

In addition to communicating with other light source controllers, the light source controller 509 may also receive input from a remote device 512 via a wireless network interface (e.g., a Bluetooth® Low-Energy (BLE) network interface). In some implementations, the communication session may be "point-to-point," defined herein to mean a direct communication session between the remote device 512 and the light source controller 509, without the use of intermediate network devices (e.g., network routers, switches, etc.). In various implementations, the wireless network interface of the light source controller 609 is implemented as part of the RF transceiver.

The lighting environment 500 illustrates a communication scenario in which the light source controller 509 is part of a network of light source controllers, while a remote device 512 establishes a network 515 with the light source controller 509 via a wireless connection, such as a Bluetooth Low Energy (BLE) connection. After establishing a communication session over a network 515 between the remote device 512 and light source controller 509, the remote device 512 may use the communication session to send commands to modify the configuration of one or more light source controllers, individually or in groups, that may be reachable via the light source controller network accessed by the RF transceiver of the light source controller 509. The light source controller 509 may discover and communicate with other light source controllers that are reachable either directly or through one or more intermediate hops (e.g., other light source controllers). In some embodiments, the light source controller 509 can provide configuration settings to the detection module. For example, the light source controller 509 may provide one or more of the environmental sensor inputs for adjustment of the threshold or bandpass filter parameters. In other embodiments, the light source controller 509 may also provide adjustment to the weighting of environmental sensor inputs.

General Considerations

Numerous specific details are set forth herein to provide a thorough understanding of the claimed subject matter. However, those skilled in the art will understand that the claimed subject matter may be practiced without these specific details. Although the foregoing describes and exemplary lighting system, the adaptive bandpass filter and/or a variable threshold comparison module may be used to process a PIR sensor signal in other types of systems. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A lighting fixture, comprising:
    a PIR sensor that generates a sensor output signal, wherein the PIR sensor is mounted on the lighting fixture;
    a temperature sensor wherein the temperature sensor detects an ambient temperature and outputs a temperature adjusted output signal based at least in part on the ambient temperature;
    a detection module that receives the temperature adjusted output signal and outputs a motion presence signal, comprising:
        a bandpass filter that filters the sensor output signal and outputs a filtered sensor output signal; and
        a threshold comparison module that compares the filtered sensor output signal to a threshold, wherein the threshold is adjusted based on the temperature adjusted output signal, wherein the detection module generates the motion presence signal indicating detected motion based on the output of the threshold comparison module; and
    a controller that receives the motion presence signal and generates a control output for controlling a light source based on the motion presence signal.

2. The lighting fixture of claim 1, wherein the detection module narrows a passband of the bandpass filter when the temperature adjusted output signal indicates a temperature that exceeds a high temperature threshold.

3. The lighting fixture of claim 1, wherein the detection module widens a passband of the bandpass filter when the temperature adjusted output signal indicates a temperature that exceeds a low temperature threshold.

4. The lighting fixture of claim 1, further comprising an ambient light sensor, wherein the ambient light sensor provides an ambient light output signal to the controller and the controller generates the control output based on the motion presence signal and the ambient light output signal.

5. The lighting fixture of claim 1, further comprising an environmental sensor that provides an environmental output signal to the detection module, wherein the detection module adjusts the threshold of the threshold detection module based on the temperature adjusted output signal and the environmental output signal.

6. The lighting fixture of claim 1, wherein the PIR sensor is mounted at a first height on the lighting fixture, wherein the detection module adjusts the threshold of the threshold comparison module based on the temperature adjusted output signal and the first height.

7. A method of detecting object motion, the method comprising:
    detecting an ambient temperature;
    adjusting a passband of a bandpass filter based on the detected ambient temperature;
    adjusting a threshold of a threshold detection module based on the detected ambient temperature;
    receiving a sensor output signal from a PIR sensor;
    filtering the sensor output signal using the bandpass filter with the adjusted passband;
    comparing the filtered sensor output signal to the adjusted threshold;
    based on the comparison generating a motion presence signal, wherein the motion presence signal indicates detected motion when the filtered sensor output signal exceeds the adjusted threshold; and
    controlling a lighting fixture based on the motion presence signal.

8. The method of detecting object motion of claim 7, wherein adjusting a passband of a bandpass filter based on the detected ambient temperature comprises narrowing the passband of the bandpass filter when the ambient temperature exceeds a high temperature threshold.

9. The method of detecting object motion of claim 7, wherein adjusting a passband of a bandpass filter based on the detected ambient temperature comprises widening a passband of the bandpass filter when the ambient temperature that exceeds a low temperature threshold.

10. The method of detecting object motion of claim 7, wherein adjusting a threshold of a threshold detection module based on the detected ambient temperature comprises increasing the threshold when the ambient temperature exceeds a high temperature threshold.

11. The method of detecting object motion of claim 7, wherein adjusting a threshold of a threshold detection module based on the detected ambient temperature comprises decreases the threshold when the ambient temperature that exceeds a low temperature threshold.

12. A lighting fixture, comprising:
    a PIR sensor that generates a sensor output signal, wherein the PIR sensor is mounted on the lighting fixture;
    an environmental sensor module wherein the environmental sensor module includes a sensor that detects movement of the lighting fixture or a sensor that detects ambient airflow and outputs an environmental sensor output signal based on sensed movement of the lighting fixture or sensed ambient airflow;
    a detection module that receives the sensor output signal and the environmental sensor output signal and outputs a motion presence signal, comprising:
        a bandpass filter that filters the sensor output signal and outputs a filtered sensor output signal; and
        a threshold comparison module that compares the filtered sensor output signal to a threshold and outputs a threshold comparison module output based on the comparison, wherein the threshold is adjusted based on the environmental sensor output signal, wherein the detection module generates the motion presence signal indicating detected motion when the filtered sensor output signal is beyond the adjusted threshold; and a controller that receives the motion presence signal and generates a control output for controlling a light source based on the motion presence signal.

13. The lighting fixture of claim 12, wherein the environmental sensor comprises a temperature sensor wherein the temperature sensor detects an ambient temperature and outputs a temperature adjusted output signal based at least in part on the ambient temperature.

14. The lighting fixture of claim 13, where the environmental sensor provides an environmental output signal to the detection module, wherein the detection module adjusts the threshold of the threshold detection module based on the ambient temperature and the environmental output signal.

15. The lighting fixture of claim 13, wherein the detection module narrows a passband of the bandpass filter when the ambient temperature exceeds a high temperature threshold.

16. The lighting fixture of claim 13, wherein the detection module widens a passband of the bandpass filter when the ambient temperature exceeds a low temperature threshold.

17. The lighting fixture of claim 12, wherein the environmental sensor comprises an ambient light sensor, wherein the ambient light sensor provides an ambient light output signal to the controller and the controller generates the control output based on the motion presence signal and the ambient light output signal.

18. The lighting fixture of claim 1, wherein the PIR sensor is mounted at a first height on the lighting fixture, wherein the detection module adjusts the threshold of the threshold comparison module based on the temperature adjusted output signal and the first height.

* * * * *